(12) United States Patent
Chan et al.

(10) Patent No.: US 10,565,432 B2
(45) Date of Patent: Feb. 18, 2020

(54) ESTABLISHING PERSONAL IDENTITY BASED ON MULTIPLE SUB-OPTIMAL IMAGES

(71) Applicant: International Business Machines Corporation, Armonk, NY (US)

(72) Inventors: Yuk L. Chan, Rochester, NY (US); Deepti M. Naphade, Cupertino, CA (US); Tin Hang To, Poughkeepsie, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/825,522

(22) Filed: Nov. 29, 2017

(65) Prior Publication Data

US 2019/0163962 A1    May 30, 2019

(51) Int. Cl.
*G06K 9/00* (2006.01)
*G05B 17/02* (2006.01)
*H04L 29/08* (2006.01)

(52) U.S. Cl.
CPC ......... *G06K 9/00288* (2013.01); *G05B 17/02* (2013.01); *H04L 67/306* (2013.01); *H04L 67/02* (2013.01); *H04L 67/10* (2013.01)

(58) Field of Classification Search
None
See application file for complete search history.

(56) References Cited

U.S. PATENT DOCUMENTS 6,418,235 B1   7/2002  Morimoto et al.
7,942,318 B2   5/2011  Abraham
(Continued)

FOREIGN PATENT DOCUMENTS

AU    2011101355 A4   12/2011
CN     104933710 A     9/2015
(Continued)

OTHER PUBLICATIONS

Bernstein, Shelley "The Realities of Installing iBeacon to Scale", BKM Tech, Feb. 4, 2015, 16 pages, <https://www.brooklynmuseum.org/community/blogosphere/2015/02/04/the-realities-of-installing-ibeacon-to-scale/>.
(Continued)

*Primary Examiner* — Fayyaz Alam
(74) *Attorney, Agent, or Firm* — Jose A. Medina-Cruz; William H. Hartwell (57) ABSTRACT

In an approach to establishing personal identity using multiple sub-optimal images, a method includes receiving a set of sub-optimal input images, identifying a first and a second user feature in the set of sub-optimal input images, and determining a confidence score of the user features by comparison to user profile images. The method additionally includes determining a combined confidence score of the first user feature and the second user feature and determining whether features match a user by: (i) determining whether the combined confidence score is higher than a pre-determined threshold for the combined confidence score, (ii) determining whether the confidence score of the first user feature is higher than a pre-determined threshold for the user features, and (iii) determining whether the confidence score of the second user feature is higher than the pre-determined threshold for the user features.

20 Claims, 5 Drawing Sheets

(56) References Cited

U.S. PATENT DOCUMENTS

| | | |
|---|---|---|
| 8,055,546 B1 | 11/2011 | Cassone |
| 8,412,932 B2 | 4/2013 | Schneider |
| 8,850,536 B2 | 9/2014 | Liberman |
| 9,082,011 B2 | 7/2015 | Komogortsev |
| 9,111,290 B2 | 8/2015 | Delgado et al. |
| 9,118,735 B1 | 8/2015 | McInerny et al. |
| 9,147,117 B1 | 9/2015 | Madhu et al. |
| 9,160,743 B2 | 10/2015 | Anantharaman |
| 9,208,177 B2 | 12/2015 | Petrou et al. |
| 9,531,998 B1 | 12/2016 | Farrell et al. |
| 9,576,135 B1 | 2/2017 | Komandoor |
| 9,579,135 B2 | 2/2017 | Cook |
| 10,078,693 B2 | 9/2018 | Brown |
| 2002/0176610 A1 | 11/2002 | Okazaki |
| 2005/0015300 A1 | 1/2005 | Smith |
| 2006/0182361 A1 | 8/2006 | Ptucha |
| 2007/0294207 A1 | 12/2007 | Brown |
| 2008/0168052 A1 | 7/2008 | Ott, IV |
| 2008/0298643 A1 | 12/2008 | Lawther |
| 2008/0304749 A1* | 12/2008 | Ogawa .............. G06K 9/00268 382/190 |
| 2009/0087036 A1* | 4/2009 | Imaoka .............. G06K 9/00288 382/118 |
| 2009/0254971 A1 | 10/2009 | Herz |
| 2009/0271493 A1 | 10/2009 | Boucard |
| 2009/0316962 A1* | 12/2009 | Sun .................. G06K 9/00248 382/118 |
| 2010/0082684 A1 | 4/2010 | Churchill |
| 2010/0257131 A1 | 10/2010 | Kim |
| 2010/0316265 A1* | 12/2010 | Nakanowatari .... G06K 9/00288 382/118 |
| 2011/0166869 A1 | 7/2011 | Froelich |
| 2011/0243465 A1 | 10/2011 | Lin |
| 2012/0114177 A1* | 5/2012 | Adachi .............. G06K 9/00362 382/103 |
| 2012/0189207 A1 | 7/2012 | Doretto |
| 2013/0073473 A1 | 3/2013 | Heath |
| 2013/0077835 A1 | 3/2013 | Knit et al. |
| 2013/0170738 A1 | 7/2013 | Capuozzo et al. |
| 2013/0262215 A1 | 10/2013 | Guay |
| 2014/0003674 A1 | 1/2014 | Coley |
| 2014/0015967 A1 | 1/2014 | Moore et al. |
| 2014/0022329 A1 | 1/2014 | Kim |
| 2014/0129942 A1 | 5/2014 | Rathod |
| 2014/0193047 A1 | 7/2014 | Grosz et al. |
| 2014/0194196 A1 | 7/2014 | Hoy |
| 2014/0207518 A1 | 7/2014 | Kannan |
| 2014/0278903 A1 | 9/2014 | Wang |
| 2014/0333413 A1 | 11/2014 | Kursun |
| 2014/0337089 A1 | 11/2014 | Tavares |
| 2014/0341440 A1 | 11/2014 | Walch |
| 2014/0365334 A1 | 12/2014 | Hurewitz |
| 2015/0042663 A1 | 2/2015 | Mandel |
| 2015/0078680 A1 | 3/2015 | Shakib et al. |
| 2015/0084984 A1 | 3/2015 | Tomii |
| 2015/0169898 A1 | 6/2015 | Lembcke |
| 2015/0269642 A1 | 9/2015 | Cai et al. |
| 2015/0324563 A1 | 11/2015 | Deutschmann |
| 2015/0324698 A1 | 11/2015 | Karaoguz |
| 2015/0363636 A1* | 12/2015 | Tate .................. G06K 9/00295 382/103 |
| 2016/0065539 A1 | 3/2016 | Mermelstein |
| 2016/0078302 A1 | 3/2016 | Kanga et al. |
| 2016/0110585 A1 | 4/2016 | Govindaraj et al. |
| 2016/0232402 A1 | 8/2016 | Jiang |
| 2016/0292700 A1 | 10/2016 | Gopal et al. |
| 2017/0017834 A1 | 1/2017 | Sabitov et al. |
| 2017/0255273 A1 | 9/2017 | Yuen |
| 2018/0068028 A1 | 3/2018 | Thirugnanasundaram |
| 2018/0075291 A1* | 3/2018 | Tian .................. G06K 9/00268 |
| 2018/0107880 A1 | 4/2018 | Danielsson |
| 2019/0042835 A1* | 2/2019 | Mostafa .............. G06K 9/00288 |
| 2019/0042866 A1* | 2/2019 | Mostafa .............. G06K 9/00926 |
| 2019/0095601 A1* | 3/2019 | Chan .................. G06F 21/32 |
| 2019/0102531 A1* | 4/2019 | Li .................... G06K 9/00288 |

FOREIGN PATENT DOCUMENTS

| | | |
|---|---|---|
| EP | 2557524 A1 | 2/2013 |
| WO | 2013192199 A1 | 12/2013 |

OTHER PUBLICATIONS

Chan et al., "Establishing Personal Identity Using Real Time Contextual Data", U.S. Appl. No. 15/716,640, filed Sep. 27, 2017, 77 pages.

Chan et al., "Determining Quality of Images for User Identification", U.S. Appl. No. 15/716,651, filed Sep. 27, 2017, 77 pages.

Chan et al., "Establishing Personal Identity and User Behavior Based on Identity Patterns", U.S. Appl. No. 15/716,665, filed Sep. 27, 2017, 77 pages.

Chan et al., "Passively Managed Loyalty Program Using Customer Images and Behaviors", U.S. Appl. No. 15/716,674, filed Sep. 27, 2017, 77 pages.

Chip, "Facebook Save Game Data", Troubles and Solutions—King of Thieves, started Apr. 1, 2016, printed on Jun. 30, 2017, 1 page, <http://forum.kingofthieves.com/topic/20704-facebook-save-game-data/>.

Davis et al., "Towards Context-Aware Face Recognition", MM'05, Nov. 6-11, 2005, Singapore, ACM 1-59593-044-2/05/0011, 4 pages, Copyright is held by the author/owner(s).

Leon, Harmon, "How 5 brands have used facial recognition technology", Digiday, Sep. 7, 2015, 4 pages, <https://digiday.com/marketing/5-campaigns-used-facial-recognition-technology/>.

Martin, James A., "6 things marketers need to know about beacons", CIO, Feb. 24, 2016, 5 pages, <http://www.cio.com/article/3037354/marketing/6-things-marketers-need-to-know-about-beacons.html?page=2>.

Minder et al., "Social Network Aggregation Using Face-Recognition", SDoW2011, Social Data on the Web, Proceedings of the 4th International Workshop on Social Data on the Web, In conjunction with the International Semantic Web Conference (ISWC2011), Bonn, Germany, Oct. 23, 2011, 15 pages, <ceur-ws.org/Vol-830/sdow2011_paper_9.pdf>.

Mliki et al., "Face Recognition Through Different Facial Expressions", J Sign Process Syst (2015) 81:433-446, DOI 10.1007/s11265-014-0967-z, Published online: Jan. 17, 2015, © Springer Science+Business Media New York 2015, <http://link.springer.com/article/10.1007/s11265-014-0967-z>.

Nick, "iBeacon and Battery Drain on Phones: A Technical Report", Aislelabs, Jul. 7, 2014, 14 pages, <http://www.aislelabs.com/reports/ibeacon-battery-phones/>.

Soyata et al., "Cloud-Vision: Real-time Face Recognition Using a Mobile-Cloudlet-Cloud Acceleration Architecture", 8 pages, 978-1-4673-2713-8/12, © 2012 IEEE.

Starr, Michelle, "Facial recognition app matches strangers to online profiles", CNET, Jan. 7, 2014, 3 pages, <https://www.cnet.com/news/facial-recognition-app-matches-strangers-to-online-profiles/>.

Todd, "Stores Using Facial Recognition to Track You . . . What?!", Yes We Coupon and More!, Sep. 28, 2016, 9 pages, <http://yeswecoupon.com/stores-using-facial-recognition-to-track-you-what/>.

Zhang et al., "Beyond Frontal Faces: Improving Person Recognition Using Multiple Cues", pp. 4804-4813, 978/1/4673-6964-0/15, © 2015 IEEE.

"Coupons are Cool, Facial Recognition is Creepy", Coupons in the News, Jul. 12, 2016, 6 pages, <http://couponsinthenews.com/2016/07/12/coupons-are-cool-facial-recognition-is-creepy/>.

IBM, Appendix P, List of IBM Patents or Patent Applications Treated as Related, dated Dec. 1, 2017, 2 pages.

* cited by examiner

ESTABLISHING PERSONAL IDENTITY BASED ON MULTIPLE SUB-OPTIMAL IMAGES

BACKGROUND OF THE INVENTION

The present invention relates generally to the field of user identification, and more particularly to user identification based on multiple sub-optimal images.

Computer vision is an interdisciplinary field that aims for computers to analyze, extract, and interpret contents of images and videos. In other words, computer vision attempts to describe the reality (e.g., the identity of a person) based on analysis of one or more images. Computer vision is used widely for tasks such as optical character recognition (OCR), object recognition in retail industry, medical imaging, motion capture, and security (e.g., monitoring pools, highway traffic, etc.). Computer vision is further used for applications such as face detection and visual authentication for computer users.

SUMMARY

A method, computer program product, and computer system is disclosed in an approach to establishing personal identity using multiple sub-optimal images. The method may include one or more processors receiving a set of sub-optimal input images corresponding to a period of time. The method may also include one or more processors identifying a first user feature and a second user feature in the set of sub-optimal input images, determining a confidence score of the first user feature based on the first user feature, and determining a confidence score of the second user feature based on the second user feature. The method may additionally include one or more processors determining a combined confidence score based on the confidence score of the first user feature and the confidence score of the second user feature and determining whether features match a user by: (i) determining whether the combined confidence score is higher than or equal to a pre-determined threshold for the combined confidence score, (ii) determining whether the confidence score of the first user feature is higher than or equal to a pre-determined threshold for the user features, and (iii) determining whether the confidence score of the second user feature is higher than or equal to the pre-determined threshold for the user features.

DETAILED DESCRIPTION

Identifying users walking into locations (e.g., stores, restaurants, or other similar locations) by comparing user biometric data (e.g., data captured with video cameras) with a plurality of social media profiles may be inefficient based on the large number social media profiles available for inspection. In general, passive management of customer loyalty programs using biometric data has been unfeasible due to the difficulty of identifying users by capturing biometric data.

Some embodiments of the present invention provide improved techniques for user identification by matching multiple sub-optimal images of the user to multiple images in a social media profile for which permission/authorization to access has been granted.

Implementation of embodiments of the present invention may take a variety of forms, and exemplary implementation details are discussed subsequently with reference to the Figures.

Figure 1:
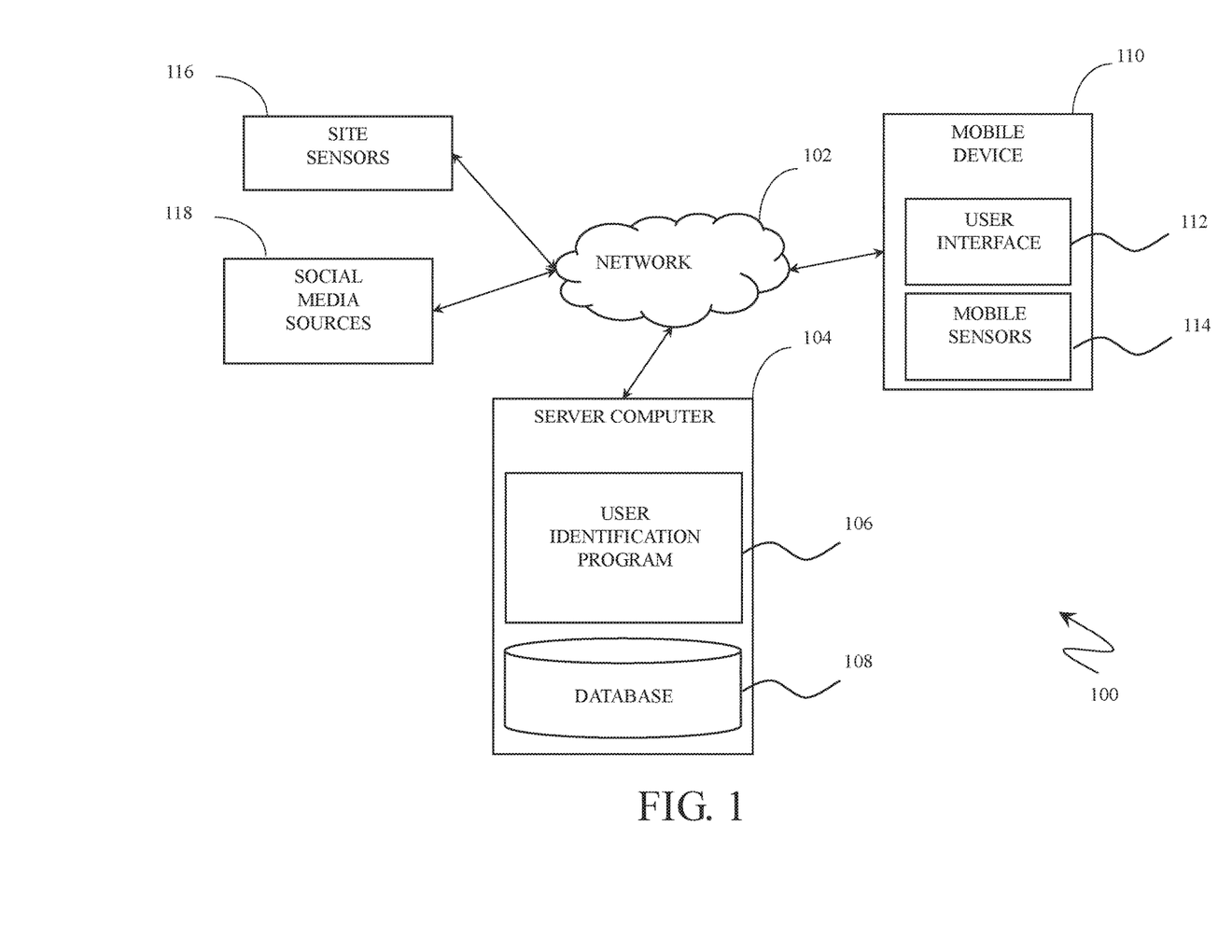
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, mobile device 110, site sensors 116, and social media sources 118, all interconnected over network 102.

In general, network 102 can be any combination of connections and protocols that will support communications between server computer 104, mobile device 110, site sensors 116, and social media sources 118, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information.

Server computer 104 can be a standalone computing device, a management server, a content service, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating with mobile device 110, site sensors 116, social media sources 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 may include internal and external hardware components, as depicted and described in further detail with respect to FIG. 5.

Mobile device 110 enables a user to access social media sources 118 and other websites and applications (not shown). For instance, mobile device 110 can be a laptop computer, a tablet computer, a smart phone, or any programmable electronic mobile device capable of communicating with various components and devices within distributed data processing environment 100, via network 102. In general, mobile device 110 represents any programmable electronic mobile device or combination of programmable electronic mobile devices capable of executing machine readable program instructions and communicating with other computing devices (not shown) within distributed data processing environment 100 via a network, such as network 102. Mobile device 110 includes an instance of user interface 112. Mobile device 110 may include internal and external hardware components, as depicted and described in further detail with respect to FIG. 5.

User interface 112 provides an interface to social media sources 118 for a user of mobile device 110. In some embodiments of the present invention, user interface 112 may be a graphical user interface (GUI) or a web user interface (WUI) and can display text, documents, web browser windows, user options, application interfaces, instructions for operation, and include the information (such as graphic, text, and sound) that a program presents to a user and the control sequences the user employs to control the program. In other embodiments, user interface 112 may also be mobile application software that provides a connection between data generated by a user of mobile device 110 and server computer 104. Mobile application software, or an "app," is a computer program designed to run on smart phones, tablet computers and other mobile devices. In other embodiments, user interface 112 may be an external device operatively connected to mobile device 110 via near field communication or other types of wired and/or wireless technologies.

Mobile device 110 may also provide mobile sensors 114 useful to identify users. Mobile sensors 114 may include cameras, global position system (GPS) sensors, and near-field communication sensors, among others.

Site sensors 116 may include any device from which an identification of a user may be obtained. For example, site sensors 116 may include biometric devices such as video cameras, depth sensors, and other similar devices. Site sensors 116 may also include near-field communication sensors to identify a user via mobile device 110.

Social media sources 118 may include one or a combination of social media websites, focused chat sites or applications, blogs, and wikis, or other content sites. Social media sources 118 may include text, graphics, pictures, and other content posted by users.

Database 108 is a repository for data used by user identification program 106. Data used by user identification program 106 may include user data such as images, identification information, user behaviors, social network data, profile data, and other information useful to determine user identification or behavior (and for which appropriate permission/authorization to access has been granted). In the depicted embodiment, database 108 resides on server computer 104. In another embodiment, database 108 may reside elsewhere within distributed data processing environment 100 provided user identification program 106 has access to database 108.

Server computer 104 includes user identification program 106 for real-time identification of users. Some embodiments of the present invention match multiple sub-optimal images of the user to multiple images in a social media profile or improve confidence score of identifying an individual by using additional sub-optimal images. These aspects of the disclosure are discussed subsequently with reference to FIGS. 2-4.

Figure 2:
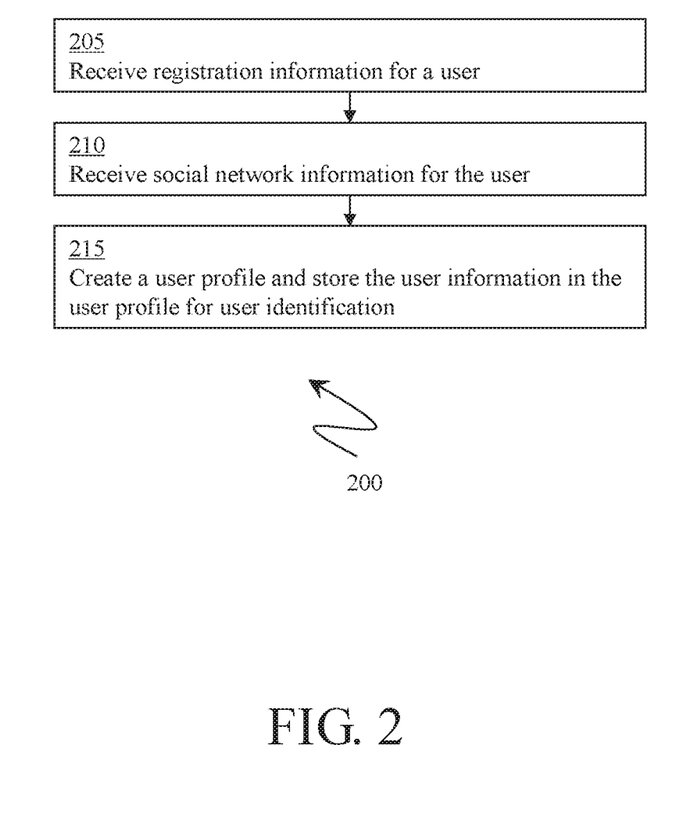
FIG. 2 is a flowchart depicting operational steps of a user identification program for creating and managing user profiles for registered users, in accordance with an embodiment of the present invention.

User identification program 106 is depicted and described in further detail with respect to FIG. 2. Referring to flowchart 200, user identification program 106 receives identification for a user, including social media profiles, in order to identify the user in the future.

Processing begins at operation 205, where user identification program 106 receives registration information for a user. In some embodiments of the present invention, the registration information for the user may be received via a registration process where the user provides profile images for high confidence identification by the system. In an example embodiment, a user named Ben registers in the user identification program 106 by providing one or more pictures coupled with personal information (e.g., address, telephone, and other similar information).

Processing continues at operation 210, where user identification program 106 receives social network information for the user. In some embodiments of the present invention, the user provides links for his/her social media profiles. In other embodiments, user identification program 106 obtains authorization to access data from the social media profiles provided by the user. In our exemplary embodiment, Ben provides a link to his social media profiles and provides user identification program 106 with the pertinent authorization to access the social media profiles.

Processing continues at operation 215, where user identification program 106 creates a user profile and stores the user information in the user profile for user identification. In an exemplary embodiment, user identification program 106 stores the identification and collected information for Ben in database 108.

Figure 3:
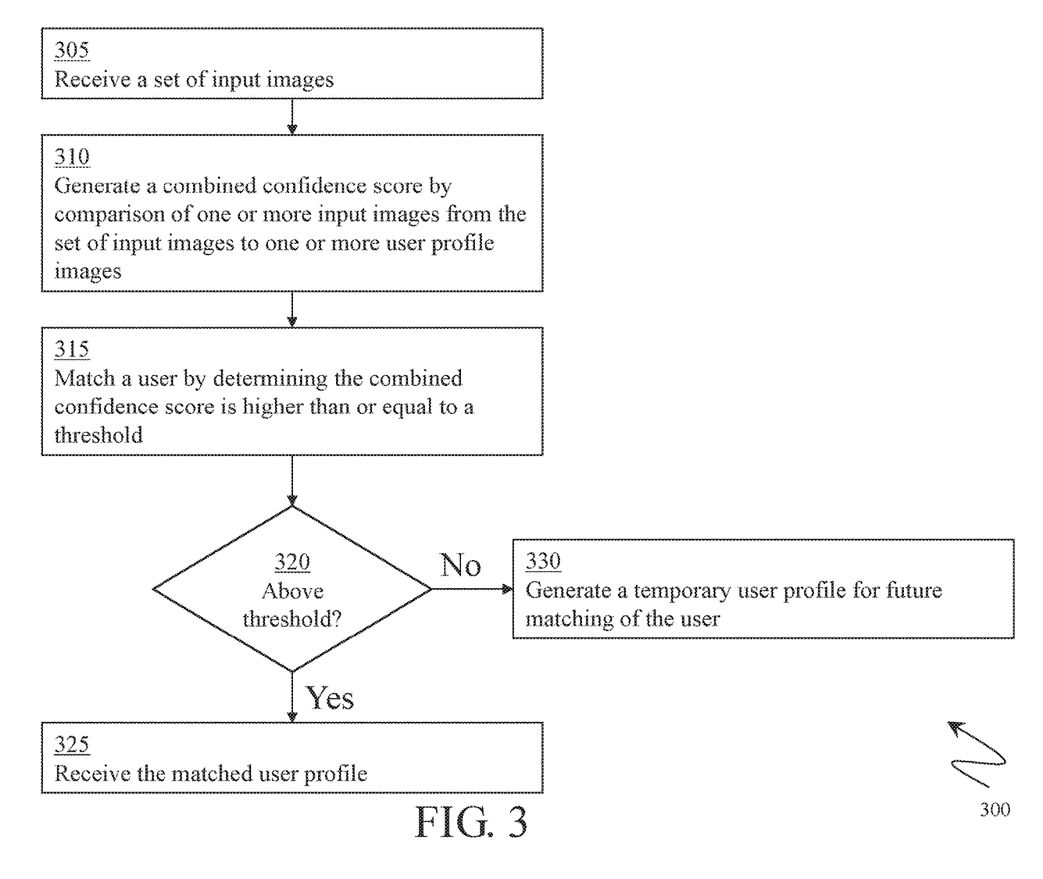
FIG. 3 is a flowchart depicting operational steps of a user identification program for matching user profiles based on multiple sub-optimal images, in accordance with an embodiment of the present invention.

User identification program 106 is depicted and described in further detail with respect to FIG. 3. Referring to flowchart 300, user identification program 106 matches a user based on multiple sub-optimal images stored in a user profile.

Processing begins at operation 305, where user identification program 106 receives a set of input images from one or more site sensors. In some embodiments of the present invention, user identification program 106 captures a set of input images for a user from site sensors 116. In an exemplary embodiment, User A walks into a restaurant. The restaurant includes a plurality of cameras. A first camera starts capturing images related to User A over time, and user identification program 106 receives a first set of input images. A second camera starts capturing images related to User A over time, and user identification program 106 receives a second set of input images. The combined first and second set of input images are captured over a period of time (shown in FIG. 4) and correspond to User A.

Figure 4:
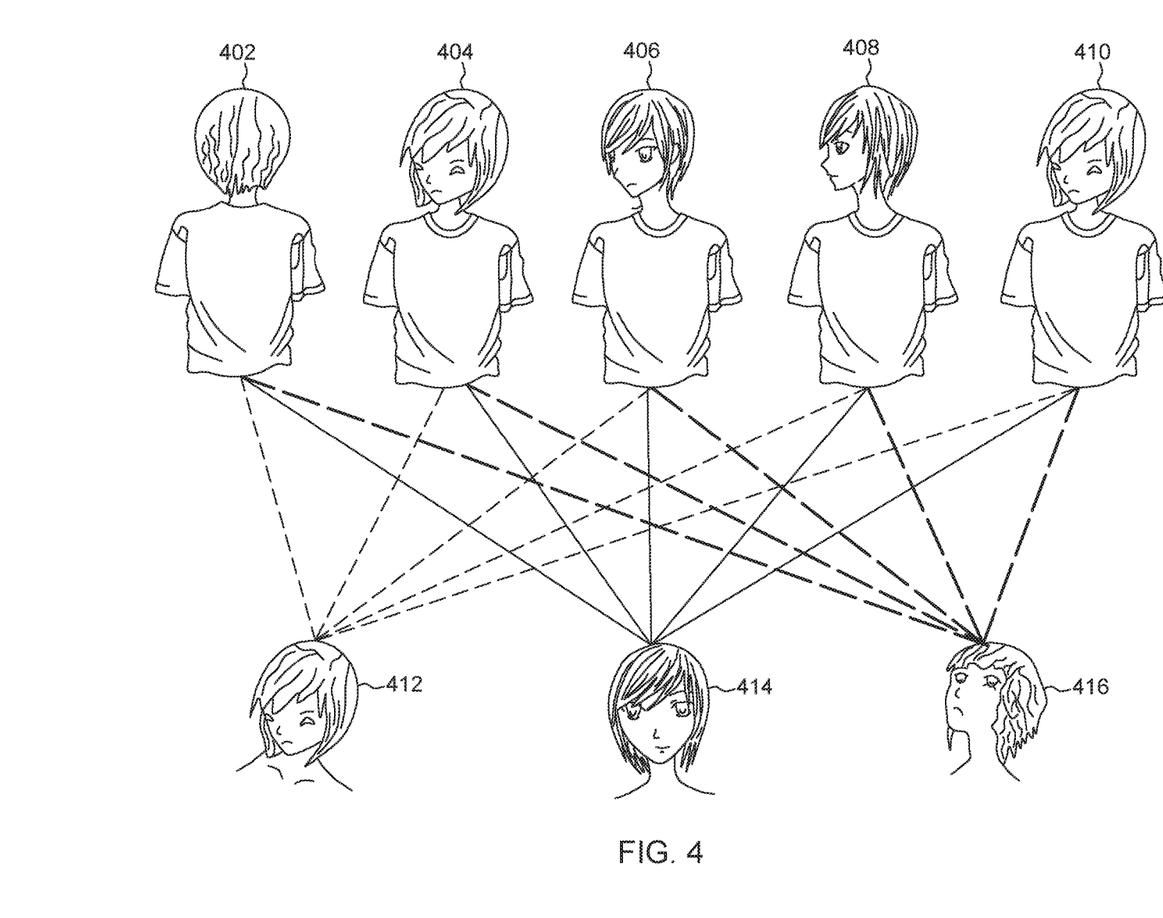
FIG. 4 shows an exemplary comparison between a set of input images and a set of profile images, in accordance with an embodiment of the present invention.

Processing continues at operation 310, where user identification program 106 generates a combined confidence score by comparison of one or more input images from the set of input images to one or more user profile images. In our exemplary embodiment, user identification program 106 matches each input image 402, 404, 406, 408, and 410 in the set of input images for User A with the user profile images 412, 414, and 416 associated with a user profile for Ben (e.g., the profile for which Ben granted access in operation 210, discussed above). Profile images 412, 414, and 416 associated with the user profile may have been chosen in accordance with one or more embodiments of the present invention based on the quality score and/or the attributes of the image as described in subsequent paragraphs. The results of the image comparisons are as follows: (i) profile image 412 matches the profile images 402, 404, 406, 408, and 410 with confidence of 0, 0.6, 0.4, 0.2, and 0.7, respectively; (ii) profile image 414 matches the profile images 402, 404, 406, 408, and 410 with confidence of 0, 0.2, 0.5, 0.3, and 0.6, respectively; and (iii) profile image 412 matches the profile images 402, 404, 406, 408, and 410 with confidence of 0, 0.3, 0.4, 0.2, and 0.6, respectively.

In some embodiments of the present invention, combining the input confidence score from comparing the input images to a known profile image can generate a combined confidence score. For example, if a combined confidence score has a range of 0 to 1, 1 means the input images together match very well with a profile image. The combination could be a simple linear combination technique, where each input confidence level is multiplied by a weight and the average or sum is used as the combined confidence score. Another combination technique may be achieved by a non-linear combination technique. The input confidence score can be removed from the combination (e.g., has a weight of 0) based on the specific criteria for the input image. For example, if the input image only includes the back of the head of a user, it might not be worthwhile to include the image in the linear combination. In another example, if the input image only includes the front of a head, it might only be used to match a profile image with a frontal deviation of less than 65 degrees to the left or right.

In some embodiments of the present invention, the input image criteria could further trigger localized image recognition technique. For example, some existing facial recognition techniques extract features (e.g., eyes, nose, mouth, ears, shape, among others) from the face. Those features may be used as key criteria for matching. In some embodiments of the present invention, these features can be extracted from multiple images captured over a period of time. For example, a first image may capture the left eye and ear perfectly, a second image may capture the right eye, right ear, mouth and nose perfectly, and a third image may capture a blurred frontal face with shape of face and approximate position of the eyes, nose and mouth. Each of these features can be compared with the profile image separately and a final score may be generated by combining the confidence scores generated from each feature.

The threshold for a match may be set based on number of local features matched. In an exemplary embodiment, the threshold may include a feature threshold of 90% (e.g., number of features that must be used in the comparison), and a score threshold of 80% (e.g., matched features must have a confidence score of at least 0.8). In some embodiments of the present invention, a profile image similar to a first image (e.g. similar face orientation face, similar face rotation angle) can be used for comparison. In another embodiment, a profile image that captures the entire frontal face can be used for comparison, where only a portion of the face (e.g., the left side of the face) in this profile image is compared with the first image. In another embodiment, each input image can be compared with multiple profile images, and the resulting score from each comparison can be combined using technique described above.

In some embodiments of the present invention, the input image criteria could further trigger a different type of image recognition technique such as eigenfaces, line edge map, edge orientation matching, skin texture analysis, color matching, among others. For example, if the input image only includes the back of the head, user identification program 106 may require color for pattern recognition. In another example, user identification program 106 implements a binary recognition technique, where a score of 1 is given if there is a match based on hair color, while a score of 0 is given if the hair color does not match. Furthermore, the combined confidence score could be weighted based on the known profile image. For example, if the known profile image includes the back of the head, a simple shape match and color match may result in confidence score of 0.9. However, the chances of having other people with the same color and same shape may be high. Therefore, this combined confidence score may be lowered by 50% resulting in a 0.45 confidence score. In some embodiments, the image recognition technique may be implemented such that the dramatic change in feature could contribute negatively to the confidence score. For example, a change of height could have a weight of −1. In some embodiments, the confidence scores may be completely overridden from other algorithms resulting in a confidence score equal to 0.

In some embodiments of the present invention, user identification program 106 receives a facial image where the subject is 45 degrees to the left (e.g., a sub-optimal image captured passively in a retail store, without the user posing specially for use with facial recognition), compares it with a frontal image (a known profile image) from a social network, and determines a 0.4 confidence score based on the comparison. User identification program 106 further receives a second facial image of the same person where the subject is 40 degrees to the upper right, compares it with the same frontal image, and determines a 0.4 confidence score. None of these sub-optimal images will generate a high enough matching confidence level of matching. However, when user identification program 106 considers both sub-optimal images together, the confidence level determined is higher (e.g., 0.7 confidence score).

In some embodiments of the present invention, more images corresponding to the same individual can be captured using the techniques previously discussed. For example, user identification program 106 may fine-tune the confidence scores by using the known profile, weights, combination techniques, and pattern matching techniques. The fine-tuning parameters may be based on exhaustive techniques where all existing pattern matching techniques are tested at least once. User identification program 106 may also use a neural network to rank and weight the type or categories of input images and known profile image. This fine-tuning can be used to discover parameters specific for each individual and/or specific to each group of individuals (e.g., based on age, and other factors).

In some embodiments of the present invention, the confidence scores for a set of images may be enhanced with the confidence score determined by the user's behavior. For example, by using multiple sub-optimal images, a user in a shopping mall has a high confidence match with two known and authorized user profiles A and B. The user profile A indicates the user purchases Chinese food from the food court 99% of time, and stops by the electronic store 100% of time. The user profile B indicates the user purchase Italian food from the food court 99% of time, and does not stop by the electronic store. If the user purchased Chinese food, and stopped by the electronic store, user identification program 106 may return a final match with user profile A. The combination of the confidence score determined by the behavior of the user and from images can be done using linear combination, non-linear combination, and any other techniques described above for combining confidence score from the sub-optimal images, among others.

Processing continues at operation 315, where user identification matches a user by determining the combined confidence score is higher than or equal to a threshold. In some embodiments of the present invention, the threshold may be a predetermined threshold or an adjustable threshold based on machine learning patterns. If the combined threshold is higher than or equal to the threshold (operation 320, "yes" branch), processing continues at operation 325, where user identification program 106 receives the matched user profile. In some embodiments, user identification program 106 receives a user profile ID for the matched user profile. In our exemplary embodiment, the predetermined threshold is 0.7 and the combined confidence score is equal to the predetermined threshold (0.7). Therefore, user identification program 106 receives the user profile for Ben. If the combined threshold is not higher than or equal to the threshold (operation 320, "no" branch), processing continues at operation 330, where user identification program 106 may generate a temporary user profile for future matching of the user. In other embodiments, user identification program 106 may select a new temporary profile to match a user based on multiple sub-optimal images.

In some embodiments of the present invention, combining the confidence scores for each profile image can improve over time and a profile image can be added or removed based on its effectiveness of providing accurate matching based on machine learning. For example, a 90% match with frontal facial image typically means a very good match of captured image and profile image for User A. If images with 45 degrees of the frontal face are also captured for User A, these images can be compared with all the profile images belonging to the user and profile images belonging to different authorized users. If these captured images match the profile image of User A with 95% confidence while the highest confidence for profile images for other users is 60%, then these captured images are assigned to User A with a very high weight. In another example, if the captured image for the user has a very low confidence score when compared with profile images for other authorized users, then this captured image can be added as a profile image for the user because no other user matches the profile image. In some embodiments, profile images that are added to a user profile will have a high weight only if the confidence score is high with respect to the matching user. In some embodiments, if the confidence score of matching is low (e.g., less than 60% confidence), the profile image will not affect the combined confidence score. In another example, a profile image can be compared with profile images of other users. In some embodiments, the weight for a profile image may be decreased or removed when the weight is below a threshold, if the profile image provides relatively high confidence score of matching other users (e.g., 70% or more).

In some embodiments of the present invention, a newly captured image can be added to the profile when a user is matched with a known, authorized profile. The threshold to add images to the profile may be more stringent than the threshold for finding a match. This reduces the chance of an occasional mismatch having a permanent negative impact to the profile. For example, if the combined confidence score of 0.8 is the threshold to consider a user matching to a profile. In order to add the newly captured images to the profile, a higher confidence score of 0.9 might be required. In another example, a multi-dimensional match including at least two facial images, clothing style, food preference, purchase habits, categories of interest and/or other factors might be a requirement to add newly captured images or newly identified behavior to the profile.

In some embodiments of the present invention, the user identity can be confirmed at a checkout process. For example, the user might use mobile payment method, store credit card for checkout, and/or provide their customer loyalty information. Once an identity is determined, the newly captured images and behaviors can be added to the user profile.

In some embodiments of the present invention, if a profile matches the user with high confidence score, that profile can be used for commercial purposes. For example, targeted push advertisement or other marketing strategies (e.g., coupons) can be directed to the mobile device of the user while the user is walking in a supermarket. In addition, based on the pushing of advertisement and corresponding action by the user (e.g., the user checks the smart phone, or the user clicks on accept or decline), the confidence score can be updated. For example, if the user checks the smart phone, then it could improve the confidence score slightly. In this case a user match cannot be guaranteed due to possibility that the user looked at the mobile device coincidentally. However, if the user checks the smart phone twice for two pushed advertisements over time, the confidence score could be improved significantly (e.g., an exponential increase). If the user does not check the smart phone or check the smart phone out of sync with the pushed advertisement, the confidence score could decrease. The matching profile for the user may be reevaluated upon a change of the confidence score.

Figure 5:
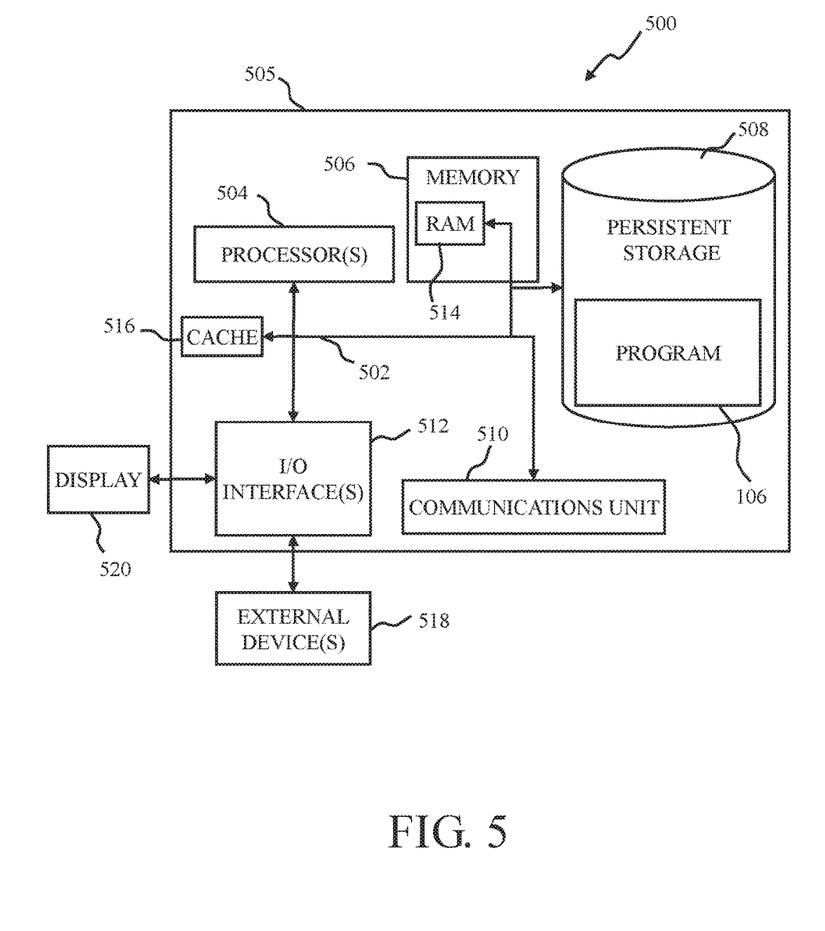
FIG. 5 depicts a block diagram of components of the server computer executing the user identification program within the distributed data processing environment of FIG. 1, in accordance with an embodiment of the present invention.

FIG. 5 depicts block diagram 500 of components of server computer 104 within distributed data processing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 505 and server computer 104 include communications fabric 502, which provides communications between computer processor(s) 504, memory 506, persistent storage 508, communications unit 510, and input/output (I/O) interface(s) 512.

Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

User identification program 106 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. User identification program 106 may be downloaded to persistent storage 508 through communications unit 510.

I/O interface(s) 512 allows for input and output of data with other devices that may be accessible to computing device 505 and server computer 104, such as mobile device 110, site sensors 116, social media sources 118, and other computing devices (not shown). For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., user identification program 106 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a set of sub-optimal input images corresponding to a period of time, wherein each input image in the set of input images corresponds to a specific time within the period of time;
   identifying, by one or more processors, a first user feature in the set of sub-optimal input images;
   determining, by one or more processors, a confidence score of the first user feature by comparison of the first user feature to one or more user profile images;
   identifying, by one or more processors, a second user feature in the set of sub-optimal input images;
   determining, by one or more processors, a confidence score of the second user feature by comparison of the second user feature to the one or more user profile images;
   determining, by one or more processors, a combined confidence score based on the confidence score of the first user feature and the confidence score of the second user feature; and
   determining, by one or more processors, whether the first user feature and the second user feature match a user by: (i) determining the combined confidence score is higher than or equal to a pre-determined threshold for the combined confidence score, (ii) determining the confidence score of the first user feature is higher than or equal to a pre-determined threshold for the first user feature and the second user feature, and (iii) determining the confidence score of the second user feature is higher than or equal to the pre-determined threshold for the first user feature and the second user feature.

2. The method of claim 1, further comprising, responsive to matching the first user feature and the second user feature to the user, receiving, by one or more processors, a user profile corresponding to the user.

3. The method of claim 1, further comprising, responsive to not matching the user, generating, by one or more processors, a temporary user profile for future matching of the user.

4. The method of claim 1, further comprising:
   identifying, by one or more processors, a first user behavior in the set of sub-optimal input images; and
   determining, by one or more processors, a behavioral confidence score by comparison of the first user behavior to one or more user profile behaviors.

5. The method of claim 4, wherein determining, by one or more processors, a combined confidence score based on the confidence score of the first user feature and the confidence score of the second user feature comprises determining, by one or more processors, a combined confidence score based on the confidence score of the first user feature, the confidence score of the second user feature, and the behavioral confidence score.

6. The method of claim 1, further comprising:
   responsive to determining the first user feature and the second user feature match the user, determining, by one or more processors, whether to store one or more images in the set of sub-optimal input images in the user profile by: (i) determining whether the combined confidence score is higher than or equal to a first storing pre-determined threshold, (ii) determining whether the confidence score of the first user feature is higher than or equal to a second storing pre-determined threshold, and (iii) determining whether the confidence score of the second user feature is higher than or equal to the second storing pre-determined threshold, wherein the first storing pre-determined threshold is more stringent than the pre-determined threshold for the combined confidence score, and wherein the second storing predetermined threshold is more stringent than the pre-determined threshold for the user features; and responsive to determining to store one or more images in the set of sub-optimal input images in the user profile, storing, by one or more processors, one or more images in the set of sub-optimal input images in the user profile.

7. The method of claim 1, wherein the techniques for identifying a user feature in the set of sub-optimal images include: (i) eigenfaces, (ii) line edge map, (iii) edge orientation matching, (iv) skin texture analysis, and (v) color matching.

8. A computer program product, comprising:
one or more computer readable storage devices and program instructions stored on the one or more computer readable storage devices, the stored program instructions comprising:
program instructions to receive a set of sub-optimal input images corresponding to a period of time, wherein each input image in the set of input images corresponds to a specific time within the period of time;
program instructions to identify a first user feature in the set of sub-optimal input images;
program instructions to determine a confidence score of the first user feature by comparison of the first user feature to one or more user profile images;
program instructions to identify a second user feature in the set of sub-optimal input images;
program instructions to determine a confidence score of the second user feature by comparison of the second user feature to the one or more user profile images;
program instructions to determine a combined confidence score based on the confidence score of the first user feature and the confidence score of the second user feature; and
program instructions to determine whether the first user feature and the second user feature match a user by: (i) determining the combined confidence score is higher than or equal to a pre-determined threshold for the combined confidence score, (ii) determining the confidence score of the first user feature is higher than or equal to a pre-determined threshold for the first user feature and the second user feature, and (iii) determining the confidence score of the second user feature is higher than or equal to the pre-determined threshold for the first user feature and the second user feature.

9. The computer program product of claim 8, the stored program instructions further comprising program instructions to, responsive to matching the first user feature and the second user feature to the user, receive a user profile corresponding to the user.

10. The computer program product of claim 8, the stored program instructions further comprising program instructions to, responsive to not matching the user, generate a temporary user profile for future matching of the user.

11. The computer program product of claim 8, the stored program instructions further comprising:
program instructions to identify a first user behavior in the set of sub-optimal input images; and
program instructions to determine a behavioral confidence score by comparison of the first user behavior to one or more user profile behaviors.

12. The computer program product of claim 11, wherein the program instructions to determine a combined confidence score based on the confidence score of the first user feature and the confidence score of the second user feature comprises program instructions to determine a combined confidence score based on the confidence score of the first user feature, the confidence score of the second user feature, and the behavioral confidence score.

13. The computer program product of claim 8, the stored program instructions further comprising:
program instructions to, responsive to determining the first user feature and the second user feature match the user, determine whether to store one or more images in the set of sub-optimal input images in the user profile by: (i) determining whether the combined confidence score is higher than or equal to a first storing pre-determined threshold, (ii) determining whether the confidence score of the first user feature is higher than or equal to a second storing pre-determined threshold, and (iii) determining whether the confidence score of the second user feature is higher than or equal to the second storing pre-determined threshold, wherein the first storing pre-determined threshold is more stringent than the pre-determined threshold for the combined confidence score, and wherein the second storing pre-determined threshold is more stringent than the pre-determined threshold for the user features; and
program instructions to, responsive to determining to store one or more images in the set of sub-optimal input images in the user profile, store one or more images in the set of sub-optimal input images in the user profile.

14. The computer program product of claim 8, wherein the techniques for identifying a user feature in the set of sub-optimal images include: (i) eigenfaces, (ii) line edge map, (iii) edge orientation matching, (iv) skin texture analysis, and (v) color matching.

15. A computer system, comprising:
one or more computer processors;
one or more computer readable storage devices;
program instructions stored on the one or more computer readable storage devices for execution by at least one of the one or more computer processors, the stored program instructions comprising:
program instructions to receive a set of sub-optimal input images corresponding to a period of time, wherein each input image in the set of input images corresponds to a specific time within the period of time;
program instructions to identify a first user feature in the set of sub-optimal input images;
program instructions to determine a confidence score of the first user feature by comparison of the first user feature to one or more user profile images;
program instructions to identify a second user feature in the set of sub-optimal input images;
program instructions to determine a confidence score of the second user feature by comparison of the second user feature to the one or more user profile images;
program instructions to determine a combined confidence score based on the confidence score of the first user feature and the confidence score of the second user feature; and
program instructions to determine whether the first user feature and the second user feature match a user by: (i) determining the combined confidence score is higher than or equal to a pre-determined threshold for the combined confidence score, (ii) determining the confidence score of the first user feature is higher than or equal to a pre-determined threshold for the first user feature and the second user feature, and (iii) determining the confidence score of the second user feature is higher than or equal to the pre-determined threshold for the first user feature and the second user feature.

16. The computer system of claim 15, the stored program instructions further comprising program instructions to, responsive to matching the first user feature and the second user feature to the user, receive a user profile corresponding to the user.

17. The computer system of claim 15, the stored program instructions further comprising program instructions to, responsive to not matching the user, generate a temporary user profile for future matching of the user.

18. The computer system of claim 15, the stored program instructions further comprising:
   program instructions to identify a first user behavior in the set of sub-optimal input images; and
   program instructions to determine a behavioral confidence score by comparison of the first user behavior to one or more user profile behaviors.

19. The computer system of claim 18, wherein the program instructions to determine a combined confidence score based on the confidence score of the first user feature and the confidence score of the second user feature comprises program instructions to determine a combined confidence score based on the confidence score of the first user feature, the confidence score of the second user feature, and the behavioral confidence score.

20. The computer system of claim 15, the stored program instructions further comprising:
   program instructions to, responsive to determining the first user feature and the second user feature match the user, determine whether to store one or more images in the set of sub-optimal input images in the user profile by: (i) determining whether the combined confidence score is higher than or equal to a first storing pre-determined threshold, (ii) determining whether the confidence score of the first user feature is higher than or equal to a second storing pre-determined threshold, and (iii) determining whether the confidence score of the second user feature is higher than or equal to the second storing pre-determined threshold, wherein the first storing pre-determined threshold is more stringent than the pre-determined threshold for the combined confidence score, and wherein the second storing pre-determined threshold is more stringent than the pre-determined threshold for the user features; and
   program instructions to, responsive to determining to store one or more images in the set of sub-optimal input images in the user profile, store one or more images in the set of sub-optimal input images in the user profile.

* * * * *